(12) United States Patent
Chi

(10) Patent No.: US 8,474,070 B2
(45) Date of Patent: Jul. 2, 2013

(54) RESIN-BASED COMPOSITE SANITARY WARE AND PREPARATION METHOD

(75) Inventor: Liqun Chi, Shanghai (CN)

(73) Assignees: Shanghai Huda Investment & Development Co., Ltd., Shanghai (CN); Qinghai Xiwang Hi-Tech & Material Co., Ltd., Qinghai Province (CN)

( * ) Notice: Subject to any disclaimer, the term of this patent is extended or adjusted under 35 U.S.C. 154(b) by 0 days.

(21) Appl. No.: 13/560,686

(22) Filed: Jul. 27, 2012

(65) Prior Publication Data

US 2012/0316279 A1 Dec. 13, 2012

Related U.S. Application Data

(63) Continuation-in-part of application No. 12/837,755, filed on Jul. 16, 2010, now abandoned.

(30) Foreign Application Priority Data

Oct. 22, 2009 (CN) .......................... 2009 1 0154406

(51) Int. Cl.
*A47K 4/00* (2006.01)
(52) U.S. Cl.
USPC ............................. 4/663; 524/425; 524/456

(58) Field of Classification Search
USPC ........................................ 4/663; 524/425, 456
See application file for complete search history.

(56) References Cited

U.S. PATENT DOCUMENTS

2005/0054761 A1* 3/2005 Guha et al. .................... 524/425
2011/0040004 A1* 2/2011 Andjelkovic et al. ......... 524/394

FOREIGN PATENT DOCUMENTS

| CN | 1167741 A | 12/1997 |
| CN | 1269623 C | 8/2006 |
| CN | 2926350 Y | 7/2007 |

* cited by examiner

*Primary Examiner* — Peter Szekely
(74) *Attorney, Agent, or Firm* — Banner & Witcoff, Ltd.

(57) ABSTRACT

The invention discloses a resin-based composite sanitary ware, which is characterized in that: the sanitary ware is made by mixing up and injecting the raw materials and then solidifying the mold; and the ingredients of the raw materials and their weight ratios are as follows: unsaturated polyester resin composition 14%-30%; unsaturated polyester anti-shrinking medium 6%-14%; reinforcing fiber 11%-37%; scale stone 10%-20%; calcium carbonate 25%-40%; initiator 0.8%-2.4%. And this invention also discloses the preparation method of the sanitary ware. Compared with the current technology, the invention has the advantages of strong strength, high tenacity, perfect self-cleaning capacity and low energy consumption.

9 Claims, No Drawings

RESIN-BASED COMPOSITE SANITARY WARE AND PREPARATION METHOD

CROSS-REFERENCE TO RELATED APPLICATIONS

This application is a continuation-in-part of U.S. Application Ser. No. 12/837,755, filed Jul. 16, 2010, now abandoned which claims priority to Chinese Patent Application CN 2009-10154406.4, filed Oct. 22, 2009. Each of these applications is incorporated herein by reference in its entirety.

FIELD OF THE INVENTION

This invention relates to a sanitary ware, in particular to a composite sanitary ware with resin and scale stone as main raw materials; this invention also discloses a preparation method of the sanitary ware.

BACKGROUND OF THE INVENTION

Common sanitary wares include bathtub, basin, toilet, urinal and bidet which are made of ceramics. However, ceramics is made by burning in kiln which is not good for the environment and requires a lot of rare earth mineral resource which is rather scarce. Therefore, the mineral resource will be definitely under stress if the situation continues this way.

Recently, some people make sanitary wares with man-made agate or acrylic; see China Invention and Patent 'Acrylic Toilet Made by Pouring Process' with patent No. ZL200410040962.6 (No. of Approval: CN126923C). This patent relates to toilets produced with components made by pouring mixture of resin and agate powder into the empty shell of the interlayer. Although the product made this way has the general characteristics of ceramics products, the process is complicated with rather high cost, restricted thickness and low self-cleaning capacity. On the above basis, another toilet with composite structure of acrylic and glass fiber reinforced plastic is made known to the public; see China Utility Model Patent 'Toilet with Composite Structure of Acrylic and Glass Fiber Reinforced Plastic' with patent No. ZL200620034821.8 (No. of Approval: CN2926350Y).

Also see China Invention and Patent Application Publication 'Artificial Marble Products and the Preparation Method' with Application No. 96106392.0 (Publication No.: CN1167741A). This application relates to products made by pouring process with marble dust, unsaturated polyester resin, aluminum hydroxide and scale stone as main raw materials, where both the product performance and the preparation process have been improved.

SUMMARY OF THE INVENTION

The invention is to provide a resin-based composite sanitary ware with high tenacity, strong strength and low cost in view of the above-mentioned technical condition.

The invention is also to provide an energy-saved and environment-protected preparation method of low cost for the resin-based composite sanitary ware.

The invention uses the following technical resolution to work out the above technical problems: a resin-based composite sanitary ware and its characteristic is that it is made by mixing up and injecting the raw materials and solidifying the mold. The ingredients of the raw materials and their weight ratios are as follows,

| | |
|---|---|
| Unsaturated polyester resin composition | 14%-30%; |
| Unsaturated Polyester anti-shrinking medium | 6%-14%; |
| Reinforcing fiber | 11%-37%; |
| Scale stone | 10%-20%; |
| Calcium carbonate | 25%-40%; |
| Initiator | 0.8%-2.4%. |

For subsequent homogenized mixture, the unsaturated polyester resin composition is made by diluting unsaturated polyester resin with styrene, and the weight ratio between the styrene and the unsaturated polyester resin shall be as follows,

| | |
|---|---|
| Styrene | 60%-65%; |
| Unsaturated polyester resin | 35%-40%. |

For subsequent even mixture, the unsaturated polyester anti-shrinking medium is made by diluting unsaturated polyester resin with a thermoplastic polymer that may be selected from the group consisting of polystyrene, polymethyl methacrylate, polyvinyl acetate, and a lactone polymer. In a representative embodiment, the thermoplastic polymer is polystyrene, and, in the unsaturated polyester anti-shrinking medium, the weight ratio between the polystyrene and the unsaturated polyester resin shall be as follows,

| | |
|---|---|
| Polystyrene | 33%-37%; |
| Unsaturated Polyester Resin | 63%-67%. |

In the (i) unsaturated polyester resin composition and (ii) unsaturated polyester anti-shrinking medium, the unsaturated polyester resin can be independently based on any suitable unsaturated polybasic acid, for example the unsaturated polyester resin in (i) and/or (ii) can be independently based on ortho-phthalic acid or meta-phthalic acid. Preferably, both (i) and (ii) are based on the same unsaturated dibasic acid (e.g., either ortho-phthalic acid or meta-phthalic acid).

Thus, according to representative embodiments, the unsaturated polyester resin composition may comprise, as an unsaturated polyester resin component, a first unsaturated polyester resin. The unsaturated polyester anti-shrinking medium may comprise, as an unsaturated polyester resin component, a second unsaturated polyester resin. In such embodiments, the first unsaturated polyester resin and the second unsaturated polyester resin may be the same or different.

The reinforcing fiber can be either nylon fiber or polyphosphazenes macro fiber.

The raw materials also contain color paste with weight ratio of 1%-4% for preparing sanitary wares of different colors.

The raw materials also contain aluminum hydroxide with weight ratio of 6%-10% for improving the quality and flame-resistant capacity of the product.

As preference, the initiator contains tert-butyl peroxybenzoate and benzoyl peroxide and the weight ratio between the tert-butyl peroxybenzoate and the benzoyl peroxide is 1:2.

A method for preparing resin-based composite sanitary ware, which includes following steps:
(1) Take the raw materials and mix them evenly into agglomerate composites;

(2) Pour the composites into the injection device of the thermosetting plastic injection machine;
(3) Inject the composites into the mold which will be heated to a temperature of between 130° C. and 150° C., and maintain the pressure for the solidification;
(4) Open the mold and take out the finished product.

As preference, vacuum extraction will be carried out to the mold in step (3) with vacuum degree of between minus 0.06 Pa and minus 0.09 Pa. Apply high-pressure injection with injection pressure of 100 kg per square centimeter. And the pressure for solidification will be maintained for over 2 to 3 minutes after the injection.

Compared with the current technology, the advantages of the invention lie in: the main raw materials are low-cost scale stone and calcium carbonate which are easily to get and it is made by solidifying the raw materials injected into the mold under high pressure; therefore, the cost is low and without burning with high energy can be saved and the labor intensity can also be reduced; the efficiency is improved by introducing the thermosetting plastic injection machine; products can be easily manufactured in mass production with low defective rate; moreover, the surface of the product is clean and as smooth as a mirror with high self-cleaning capacity and can be maintained at normal temperature without cold feeling; the whole product is rather light with advantages of high tenacity and strong strength.

DETAILED DESCRIPTION OF THE INVENTION

Further detailed description will be made of the invention with the following example.

The method for preparing Kunlun rock crystal mainly includes the following steps:
(1). Mix the unsaturated polyester resin composition and unsaturated polyester anti-shrinking medium, having high performance, into the Kunlun rock crystal powder (with scale stone as primary ingredient), particles of various sizes, polyester fiber, nylon fiber, pigment and initiator, and knead them into agglomerate composites with kneading machine;
(2). Pour the agglomerate composites into the charging basket of the specially-made injection device;
(3). Input the material quantity of a single sanitary product into the computer control program of the thermosetting plastic injection machine, and the quantitative injection machine will inject the materials into the metal mold of the sanitary product with piston barrel and high pressure;
(4). The metal injection mold of the sanitary product will be heated by importing oil and the temperature will be maintained between 130° C. and 150° C. Extract vacuum from the metal mold with vacuum degree of between minus 0.06 and minus 0.09 Pa so that there will be no air hole in the sanitary product;
(5). After the composites have been injected into the metal mold, they will be heated to high temperature for solidification and the pressure will be maintained for 2 minutes, which will prevent the product from shrinking or deforming;
(6). After the solidification, the metal mold will be opened with a machine, and the product will be pushed out by the push out system and taken out from the mold with a mechanical hand and placed on the product testing and packaging production line.

Embodiments of different ingredients are as follows,

EMBODIMENT 1

Unsaturated polyester resin composition 18%, unsaturated polyester anti-shrinking medium 10%, nylon fiber (with length of 3-5 mm) 20% (reinforcing fiber); polyester fiber (with length of 5-10 mm) 10% (also reinforcing fiber), scale stone particulates of category 1200 13%, calcium carbonate powder of category 1000 27%, color paste 3% and initiator 1%. The initiator contains tert-butyl peroxybenzoate (TBPB) and benzoyl peroxide (BPO) and the weight ratio between the tert-butyl peroxybenzoate and the benzoyl peroxide is 1:2. Products made in this embodiment will be thin and light with smooth lines and arcs, and its tensile strength can reach 70 Mpa and both the compressive strength and bending strength can be over 100 Mpa.

Swancor 928 produced by Swancor Ind. Co., Ltd. is adopted to be the unsaturated polyester resin composition in the embodiment with fixed purity of the unsaturated polyester resin of between 35% to 40% and the rest is styrene; and Swancor 7310 produced by Swancor Ind. Co., Ltd. is adopted to be the unsaturated polyester anti-shrinking medium with fixed purity of the unsaturated polyester resin of between 63% to 67% and the rest is polystyrene.

EMBODIMENT 2

Unsaturated polyester resin composition (Swancor 928) 16%, unsaturated polyester anti-shrinking medium (Swancor 7310) 12%, polyphosphazenes macro fiber (with length of 3-6 mm) 5%, polyester fiber (with length of 5-10 mm) 10%, scale stone particulates of category 1200 15%, calcium carbonate powder of category 1000 32%, aluminum hydroxide powder 8%, color paste 3% and initiator 1%. Sanitary products made in this embodiment have excellent flame-resistant capacity reaching UL94V-0 grade and characteristics of high temperature resistance and corrosion resistance and can be maintained at normal temperature without cold feeling. The polyphosphazenes macro fiber used in the embodiment is reinforcing fiber which will improve the strength and the tenacity of the products.

EMBODIMENT 3

Polyphosphazenes modified unsaturated polyester resin composition (diphenyl oxide polyphosphazenes) 16%, unsaturated polyester anti-shrinking medium (Swancor 7310) 12%, nylon fiber (with length of 3-5 mm) 6%, polyester fiber (with length of 5-10 mm) 12%, scale stone particulates of category 1200 20%, calcium carbonate powder of category 1000 32%, color paste 3% and initiator 1%. The water contact angle of the sanitary products made in this embodiment reaches 95 degree, which has significantly improved the waterproof capacity; and the surface is clean with self-cleaning capacity, rather high hardness and quite perfect impact resistance and abrasion resistance capacity.

The percents referred to in the above embodiments are all mass percents, and the sanitary products can be washbasin, bathtub, toilet, bidet, urinal and shower tub, etc.

The invention claimed is:
1. A resin-based composite sanitary ware, wherein said sanitary ware is made by mixing and injecting raw materials and solidifying in molds, wherein said raw materials comprise ingredients in weight ratios as follow:

| | |
|---|---|
| Unsaturated polyester resin composition | 14%-30%; |
| Unsaturated polyester anti-shrinking medium | 6%-14%; |
| Reinforcing fiber | 11%-37%; |
| Wollastonite | 10%-20%; |
| Calcium carbonate | 25%-40%; and |

-continued

| | |
|---|---|
| Initiator | 0.8%-2.4%; | and wherein the unsaturated polyester resin composition comprises, by weight:

| | |
|---|---|
| Styrene | 60%-65%; |
| Unsaturated polyester resin | 35%-40%. |

2. The resin-based composite sanitary ware of claim 1, wherein in the unsaturated polyester resin composition, the unsaturated polyester resin is based on ortho-phthalic acid or meta-phthalic acid.

3. The resin-based composite sanitary ware of claim 1, wherein the unsaturated polyester anti-shrinking medium comprises, by weight,

| | |
|---|---|
| Polystyrene | 33%-37%; |
| Unsaturated Polyester Resin | 63%-67%. |

4. The resin-based composite sanitary ware of claim 1, wherein the reinforcing fiber is nylon fiber or polyphosphazenes macro fiber.

5. The resin-based composite sanitary ware of claim 1, wherein the raw materials further comprise color paste at a weight ratio of 1%-4%.

6. The resin-based composite sanitary ware of claim 1, wherein the raw materials further comprise aluminum hydroxide at a weight ratio of 6%-10%.

7. The resin-based composite sanitary ware of claim 1, wherein the initiator contains tert-butyl peroxybenzoate and benzoyl peroxide and the weight ratio of the tert-butyl peroxybenzoate to the benzoyl peroxide is 1:2.

8. The resin-based composite sanitary ware of claim 1,
   wherein said mixing comprises mixing the raw materials evenly into agglomerate composites, and
   wherein said injecting comprises pouring the agglomerate composites into an injection device of a thermosetting plastic injection machine; and
   wherein said solidifying in the molds comprises vacuum extracting the molds with a vacuum degree of between minus 0.06 Pa and minus 0.09 Pa; injecting the agglomerate composites into the molds, applying high-pressure injection with an injection pressure of 100 kg per square centimeter, and heating the molds to a temperature of between 130° C. and 150° C., and maintaining the molds at said vacuum degree for at least 2 minutes after injection.

9. The resin-based composite sanitary ware of claim 8 wherein the molds are maintained at said vacuum degree for at least 3 minutes after injection.

\* \* \* \* \*